United States Patent [19]
Godwin et al.

[11] Patent Number: 6,058,426
[45] Date of Patent: May 2, 2000

[54] SYSTEM AND METHOD FOR AUTOMATICALLY MANAGING COMPUTING RESOURCES IN A DISTRIBUTED COMPUTING ENVIRONMENT

[75] Inventors: Debbie A. Godwin, Pflugerville; Kathryn I. Hansen, Austin, both of Tex.

[73] Assignee: International Business Machines Corporation, Armonk, N.Y.

[21] Appl. No.: 08/891,914

[22] Filed: Jul. 14, 1997

[51] Int. Cl.[7] .................................................. G06F 12/00
[52] U.S. Cl. ........................ 709/229; 709/223; 709/224
[58] Field of Search ........................ 395/200.59, 200.53, 395/200.54, 186; 707/10, 9; 705/8; 709/229, 223, 224; 713/200

[56] References Cited

U.S. PATENT DOCUMENTS

| | | | |
|---|---|---|---|
| 4,825,354 | 4/1989 | Agrawal et al. | 364/200 |
| 5,018,096 | 5/1991 | Aoyama | 364/900 |
| 5,369,570 | 11/1994 | Parad | 395/200.59 |
| 5,483,652 | 1/1996 | Sudama et al. | 707/10 |
| 5,678,041 | 10/1997 | Baker et al. | 709/229 |
| 5,720,033 | 2/1998 | Deo | 713/200 |
| 5,740,362 | 4/1998 | Buickel et al. | 707/10 |
| 5,740,422 | 4/1998 | Foltz et al. | 395/200.59 |
| 5,764,887 | 6/1998 | Kells et al. | 395/186 |
| 5,765,153 | 6/1998 | Benantar et al. | 707/9 |
| 5,787,427 | 7/1998 | Benantar et al. | 707/10 |
| 5,815,574 | 9/1998 | Fortinsky | 380/25 |
| 5,826,239 | 10/1998 | Du et al. | 705/8 |
| 5,832,483 | 11/1998 | Barker | 709/229 |

OTHER PUBLICATIONS

"Application Interface for Managing Group Logon Assignments," *IBM Technical Disclosure Bulletin*, vol. 37, No. 4B, Apr. 1994, pp. 53–55.

*Primary Examiner*—Ahmad F. Matar
*Assistant Examiner*—Philip B. Tran
*Attorney, Agent, or Firm*—David A. Mims, Jr.; Jack V. Musgrove; Andrew J. Dillon

[57] ABSTRACT

The present invention is directed to a system and method for managing resources in an information handling system. The present invention provides a "one stop" local area network (LAN) based registration tool that provides a common set of user and administrative functions. The goal of the present invention is to give the end user the responsibility of managing her own resources. One aspect of the present invention is a method for managing resources in a distributed computing environment. Another aspect of the present invention is a client/server, object oriented, distributed computing product (DCE) based tool, with application agents being used to manage individual services. The present invention receives client requests for resources from an application. These resources may include a password to obtain access to the application or to resources controlled by the application. Rules are checked to determine if prior approval is needed to process the request. If it is necessary to obtain approvals, including IDs on other systems, these approvals are obtained. Next, the resource request is sent to an application agent for processing. The application agent processes the requests, and then the rules are checked again to determine if notifications have to be sent (for example, to the requestor's manager). Any required notifications are then sent.

27 Claims, 6 Drawing Sheets

Microfiche Appendix Included
(2 Microfiche, 66 Pages)

SYSTEM AND METHOD FOR AUTOMATICALLY MANAGING COMPUTING RESOURCES IN A DISTRIBUTED COMPUTING ENVIRONMENT

CROSS-REFERENCE TO RELATED APPLICATION

The subject matter of this application is related to application Ser. No. 08/554,431 (now U.S. Pat. No. 5,740,362) for "Method and System for Managing Network Distributed Agents," filed on Nov. 6, 1995, assigned to a common assignee with this application, and incorporated herein by reference.

Appendices A–D are submitted in the form of microfiche (66 frames, 2 slices) and therefore appendices A–D are not to be printed.

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to the field of information handling systems, and, more particularly, to a system and method for managing resources within an information handling system.

BACKGROUND OF THE INVENTION

Efficient and reliable management of system resources is critical to the success of many businesses, both large and small. Employees within a company need access to various tools and resources within the company's information handling system (or systems). It is not unusual for one employee to have several, or even dozens, of authorizations, logons, and passwords, which allow the employee to access the tools and resources she needs to perform her job effectively. A further complication is that typically each employee, or group of employees in the case of a larger company, requires access to different combinations of information resources.

A problem often arises when an employee leaves a company, or takes a different job within the same company. It is often desirable to revoke all of the employee's accesses to information resources. However, if the employee has several authorizations or passwords, it is easy to inadvertently overlook one or more of these authorizations. This can create a security problem in that an employee (or former employee) may continue to have access to resources to which she should no longer have access.

Many types of resources require revalidation on a periodic basis. Currently, users must revalidate all logons, passwords, and authorizations one at a time. If the user forgets to revalidate one or more authorizations, the user may suddenly find herself without access to a needed resource.

Prior art approaches have focused on the problem of verifying the identity of a person attempting to gain access to a particular resource. Currently, there is no system or method available which addresses the problem of managing and allocating all resources within an information handling system.

Consequently, it would be desirable to have a system and method for managing and allocating resources in an information handling system. It would be desirable to allow users to request and obtain access to all needed resources in one place. It would also be desirable to provide a system and method for tracking resource allocation and use, and for allowing all user authorizations to be either revalidated or canceled at the same time, while maintaining a high level of security.

SUMMARY OF THE INVENTION

Accordingly, the present invention is directed to a system and method for managing resources in an information handling system. The present invention provides a "one stop" local area network (LAN) based registration tool that provides a common set of user and administrative functions. The goal of the present invention is to give the end user the responsibility of managing her own resources. In addition, the present invention provides a rule-based method for application administrators to set up their application (i.e. for approval, etc.) The rules dictate such things as approval routing and notification mechanisms.

One aspect of the present invention is a method for managing resources in a distributed computing environment. Another aspect of the present invention is a client/server, object oriented, distributed computing product (DCE) based tool, with application agents being used to manage individual services. The DCE environment is utilized in order to take advantage of DCE security features. These security features include total encryption before data is sent across the network, and authentication mechanisms. DCE also helps facilitate the authentication and communication between the various application agents.

The present invention receives client requests for resources from an application. These resources may include a password to obtain access to the application or to resources controlled by the application. Rules are checked to determine if prior approval is needed to process the request. If it is necessary to obtain approvals, including IDs on other systems, these approvals are obtained. Next, the resource request is sent to an application agent for processing. The application agent processes the requests, and then the rules are checked again to determine if notifications have to be sent (for example, to the requestor's manager). Any required notifications are then sent.

Another aspect of the present invention is as a set of instructions resident in a computer system for executing the method of the present invention.

One advantage of the present invention is that it efficiently manages and allocates resources in an information handling system. Another advantage of the present invention is that it allows users to request and obtain access to all needed resources in one place. A further advantage of the present invention is resource allocation and use may be easily tracked, user authorizations are easily revalidated or canceled at the same time, and a high level of security is maintained at all times.

BRIEF DESCRIPTION OF THE DRAWINGS

The foregoing and other features and advantages of the present invention will become more apparent from the detailed description of the best mode for carrying out the invention as rendered below. In the description to follow, reference will be made to the accompanying drawings, where like reference numerals are used to identify like parts in the various views and in which.

DETAILED DESCRIPTION OF A PREFERRED EMBODIMENT OF THE INVENTION

Overview

Figure 1:
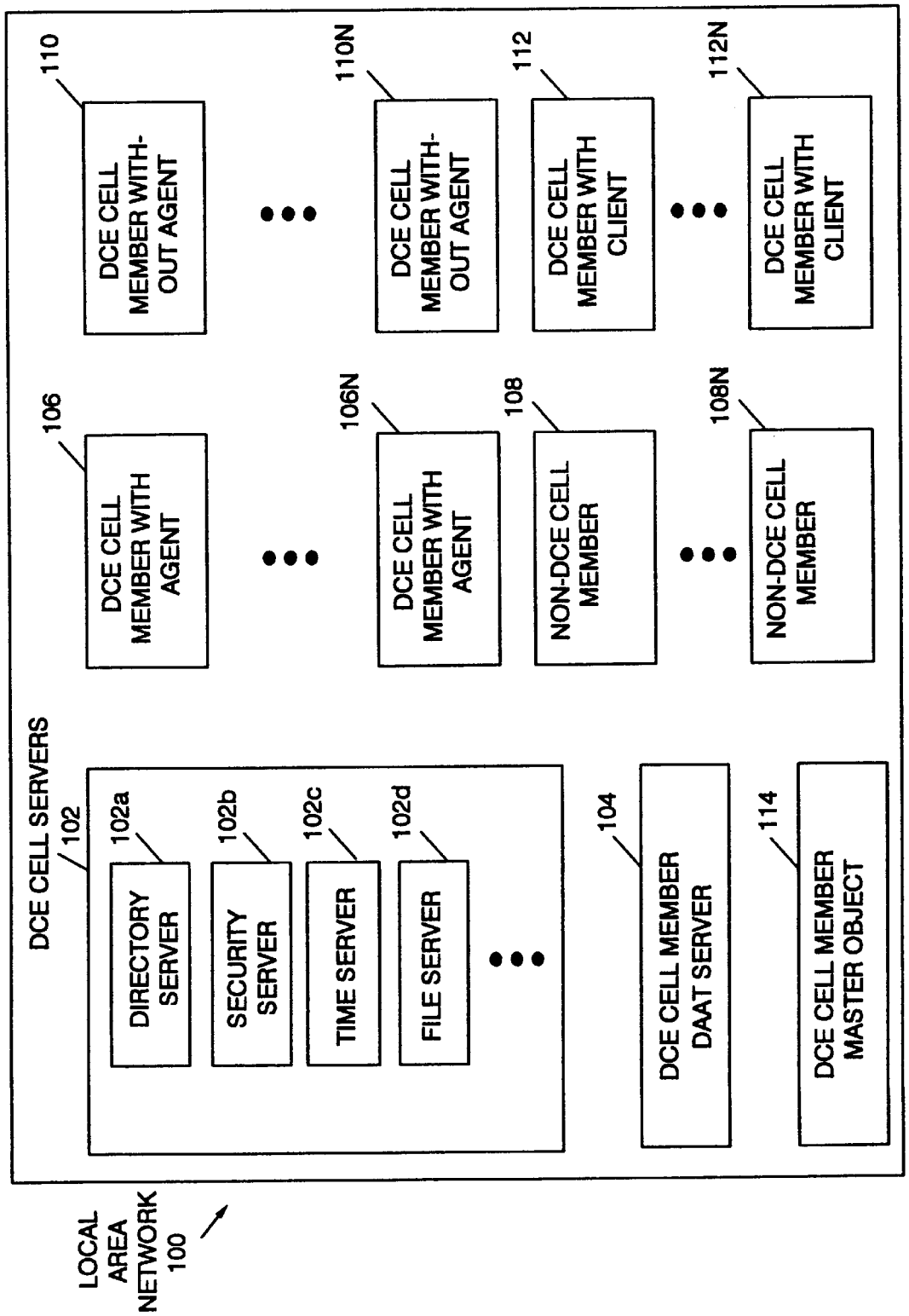
FIG. 1 is a schematic diagram illustrating various components of a local area network (LAN) according to the teachings of the present invention.

The Distributed Access Administration Tool (DAAT) of the present invention provides a "one stop" local area network (LAN) based registration tool that provides a common set of user and administrative functions. The goal of DAAT is to give the end user the responsibility of managing her own resources. In addition, DAAT provides a rule-based method for application administrators to set up their application (i.e. for approval, etc.) The rules dictate such things as approval routing and notification mechanisms.

DAAT is a client/server, object oriented, distributed computing product (DCE) based tool, with application agents being used to manage individual services. This tool is implemented in the DCE environment in order to utilize the DCE security features. These security features include total encryption before data is sent across the network, and authentification mechanisms. DCE also helps facilitate the authentication and communication between the various application agents.

DAAT, as currently implemented, utilizes the "C" and "C++" programming languages, as well as perl and korn shell scripts. Users log into DAAT with a DCE ID and password. This authenticates the user and identifies her to DAAT. The identity of initiators of requests in DAAT is thus known because each user must log in with a DCE ID and password.

DAAT utilizes a database to store employee, application, user ID, tasks, rules and request information. The DAAT server consists of APIs (currently implemented in "C," although they may be implemented in any language) available for clients to use to communicate with the DAAT server, and application agent APIs for the DAAT server to communicate with the various application agents. New applications for DAAT can easily be added due to the object oriented design and generic code handling in the DAAT server. A new application can typically be supported in a matter of hours. This system then fully automates the entire process by removing all manual administrative tasks such as approval routing, ID/resource creation, password reset, etc. The DAAT server manages and stores information collected from users and passes data on to various services and products through the application agents. The automation from end user to application administrator is accomplished through the following high level steps:

1) User requests are accepted through a client inter face.
2) All requests and approval records are stored in the database providing audit control (i.e. no paper trail to keep).
3) The application agent process requests sent from the DAAT server to create the resource/ID and sends the password to ID owner.

DAAT provides many advantages over the prior art systems and methods for managing resources. DAAT provides "one-stop shopping" for user IDs and resources. There is one place for users to come to request and manage IDs and resources. DAAT is able to provide this functionality because all the data (request, user IDs, employee information, etc . . . ) is stored in a database (currently a DB2/6000 database, however, any database may be used). The database is used by the DAAT server for processing requests, which are stored in a service queue request table, referred to as svc_que_rqst, as they enter DAAT through the APIs.

The data stored in the database allows DAAT to provide detailed reports for billing and other user and administrative queries, as well as a detailed audit trail for all stages of a request. All user IDs with owner serial numbers, as well as requests which are timestamped, are stored in the relevant DAAT tables for audit and tracking purposes. The audit log table provides the detailed audit trail by storing all states of a request as it is processed through DAAT. The DAAT database also provides more information and more accurate information than the information provided by a manually maintained paper trail. Because the identity of the initiator of any request is known (the initiator must authenticate herself by logging in with her DCE ID and password), that information is stored in the database along with each request.

The flexibility of the APIs and the database tables allows for a wide array of administrative tools. These tools exist to facilitate the DAAT administrator's daily activities. One such tool, purge, moves records from the svc_que_rqst table to the service log table. This helps maintain a relatively small working queue table (svc_que_rqst), but keeps requests in the log for reference, queries and audit ability.

Because all of the ID data is stored in one place (i.e. in the database), DAAT helps a company track and manage all employee IDs and resources. When a person leaves the company (this is tracked by the status field in the employee table), all IDs belonging to that employee can be removed at the same time. In addition, all of an employee's IDs can be revalidated at one time.

DAAT provides an application administrator with the ability to set up customized rules for an application per task. These rules determine the functions the application can perform, along with which user types can perform them. The customized rules feature allows the administrator to very easily turn functions on or off for different user types. The rules, driven by the type of user, define who can perform what tasks, if approval is needed, and if notifications are to be sent. When requests are submitted to DAAT, the DAAT server obtains any necessary approvals, as determined by the rules for each application task. DAAT handles multiple levels of parallel approval. The approvers are set up according to customizable rules set forth by an application administrator. Once set up, the approvers are managed (i.e. can be changed at any time) by the application administrator. The customizable rules offered for application administrators to set up through DAAT offer the administrator the ability to set certain application tasks requiring approval, mail notifications, etc.

The customizable rules also allow an administrator to set pre-requisite ID rules for an application. The rules can specify whether the user must own an ID on the pre-required system or own the same ID on the pre-required system. For example, if a user requests an ID on System4, and System4 requires that the user have IDs on System1, System2, and System3, DAAT determines if an ID (by same ID or same owner) exists for the pre-requisite systems. If the user doesn't have an ID, then DAAT automatically generates the request for those IDs needed. In this way, DAAT also help maintain a global namespace for all IDs across all systems.

Application availability is not an issue for user requests, as DAAT accepts requests for applications whether they are currently executing or not. A user never knows if the application agent is running or down. The DAAT server manages the requests and sends them to an application that is down as soon as the application is back-on-line. This means that application administrators can take their applications down for maintenance without the end-user registration services being affected.

DAAT supports automation of the following functions for all application agents (if the application has the function available):
Register (Enroll)
Delete (Unenroll)
Update
Transfer
Rename
Suspend
Resume The typical operations of DAAT will now be described. A request is received by the DAAT server from a client and is placed in the DAAT svc_que_rqst table. All states of a request are logged in the audit table (svc_audit_log). The rules for the requested application and task are checked and any necessary approvals are handled in the DAAT server. Once all approvals are completed, the request is sent to the appropriate application agent. Once the agent has completed all processing, a status (i.e. return code) is reported back to the DAAT server and logged in the svc_que_rqst table for the appropriate request. The application and task rules are once again checked and any notifications that need to be sent are mailed to the appropriate person or persons (based on the rules).

As discussed above, the objective of DAAT is to provide a "one stop," LAN based registration tool that provides a common set of user and administrative functions. DAAT provides a central point of control for access administration for a diverse set of LAN based products and applications. DAAT is a comprehensive, easy to use and convenient ID administration tool for end-users, managers, and administrators. It serves as a repository of employee's IDs/resources that allows users to view their ID information, as well as make direct requests for new IDs or ID changes. In addition, DAAT is an aid to managers and administrators who approve and assign IDs.

Referring now to FIG. 1, the various components of a local area network (LAN) 100 on which DAAT may be implemented will now be described. LAN 100 is heterogeneously populated with DCE cell members 106–106N, 110–110N, and 112–112N, nonDCE cell members 108–108N, DAAT server 104, and Master Object (MOB) 114. In the described embodiment, a DCE cell is defined by DCE cell servers 102, DCE cell members 106–106N with agents, DCE cell members 110–110N without agents, and DCE cell members 112–112N with clients. It is well understood by those of ordinary skill in that art that any DCE cell is defined by its members, and therefore, the boundaries of the DCE cell are logical as opposed to physical. It should also be clearly understood that LAN 100 is merely illustrative of one of numerous variations in which the present invention can be practiced.

Figure 2:
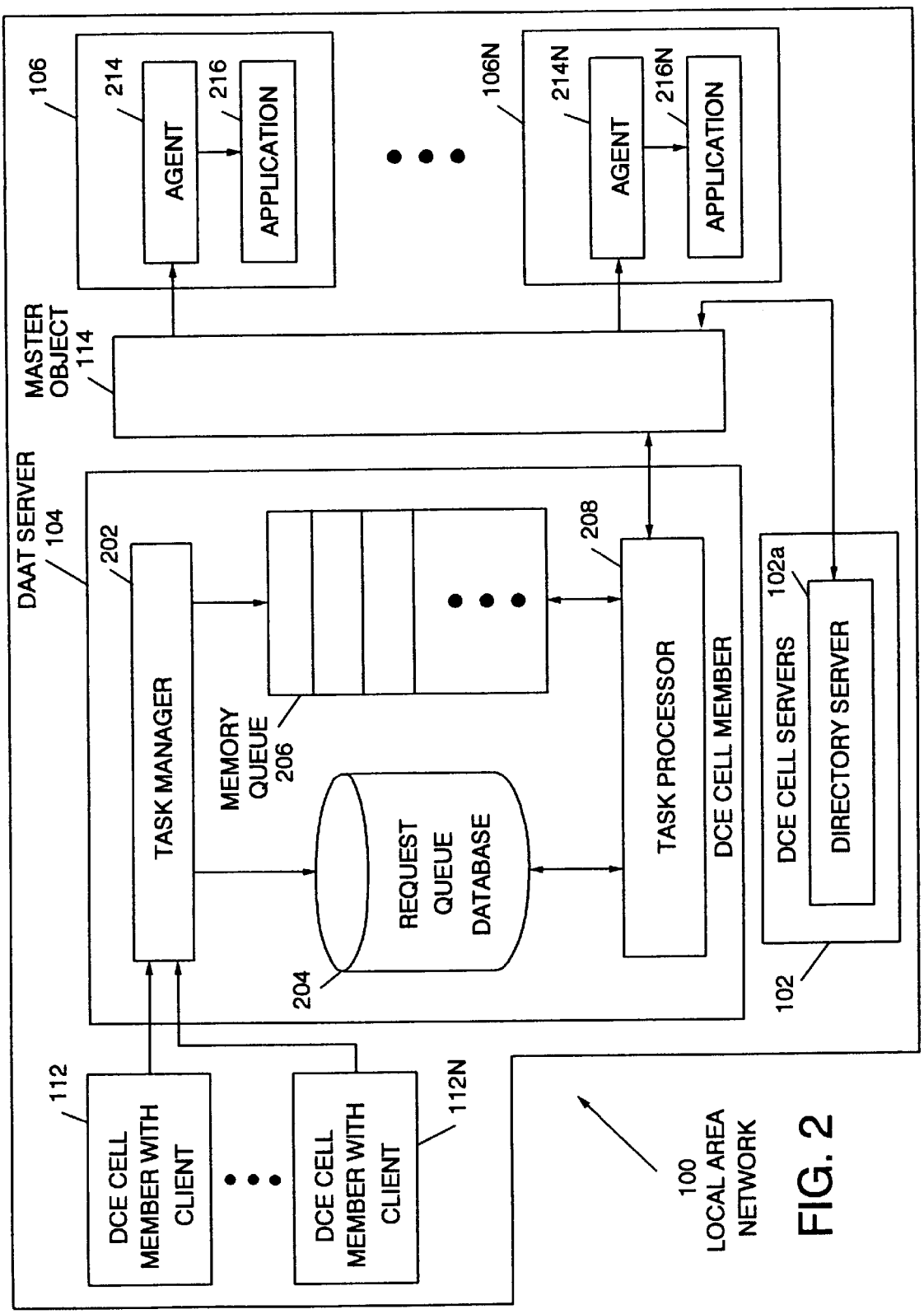
FIG. 2 is a block diagram illustrating in greater detail selected components of the LAN of FIG. 1.

Referring now to FIG. 2, a block diagram is shown illustrating in greater detail selected components of the LAN 100 of FIG. 1 according to the teachings of the present invention. As is shown in FIG. 2, each of the DCE cell members having a client 112–112N communicate with DAAT server 104, which in turn communicates with Master Object (MOB) 114. MOB 114 communicates with DCE Cell servers 102 and DCE cell members 106–106N having an agent 214–214N. Each one of the agents 214–214N has an application 216–216N, respectively. A brief description of each one of the above noted components is provided below.

Each one of the DCE cell members 112–112N gather data from their respective users and send requests to DAAT server 104. The requests may be, for example, creation of a user ID, deletion of a user ID, or ID password reset.

DAAT server 104 processes the requests by communicating with applications 216–216N via MOB 114 and agents 214–214N, respectively. DAAT server 104 includes a task manager 202, a request queue database 204, a memory queue 206, and a task processor 208. DAAT server 104 also includes application identifications implemented as DCE principal names (AppIds) to reference each one of the applications 216–216N. In general, DAAT server 104 is a client/server application which administers resources of LAN 100 such as TCP/IP addresses, Lotus Notes user IDs, AFS user IDs, and the like.

MOB 114, essentially, provides a single access point to agents 214–214N, and the ability to recognize and access new agents (not shown) without requiring a shut down or restart of DAAT server 104.

Agents 214–214N are servers/clients to applications 216–216N, respectively, and are written by customers using DCE. In general, agents 214–214N manage resources and monitor request from DAAT server 104 to perform actions on those resources. Applications 216–216N are application programs such as mail communication or the like. A more detailed description of the interaction between the various above noted components for the processing of a request is provided hereinafter.

Each one of the DCE members 112–112N provide requests to DAAT server 104 in a formatted string context. Each request includes a task action such as available, enroll, unenroll, suspend, resume, transfer, rename, query, list, or update.

The task manager 202 receives requests from DCE members 112–112N, stores them in the request queue database 204, and places notifications of the requests in the memory queue 206. The task processor 208 receives these notifications by monitoring the memory queue 206. Thereafter, the requests are forwarded to MOB 114 with an AppId.

DAAT Architecture

The DAAT architecture is based on a client-server model using a central DAAT server 104 to manage information collected from users and passed on to agents 214–214N of the various products and services. DAAT server 104 maintains all data, manages approval and validation of requests, and forwards the requests on to the proper application 216–216N via RPC calls.

Figure 3:
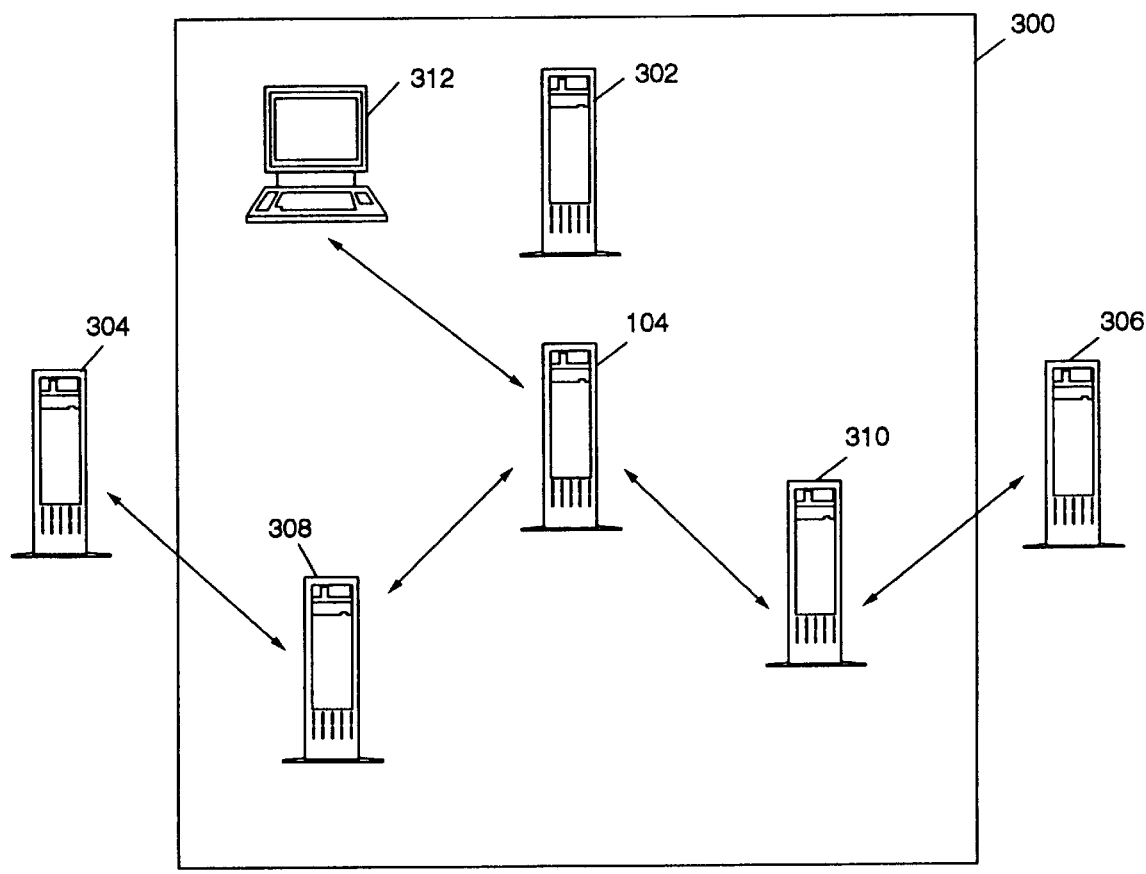
FIG. 3 is a block diagram of a system environment in which the present invention may be executed.

Referring now to FIG. 3, a block diagram of the DAAT environment is depicted. All servers inside block 300 are running DCE clients, and are configured to DCE cell 302. This enables them to use DCE services to communicate among one another. The servers outside block 300 represent the application servers, in this case TaP/2 server 304 and D26DAAT1 local name and address book server 306. The DAAT agent code running on application agent servers 308 and 310 makes calls directly to application servers 304 and 306 to complete the requests.

Users access DAAT through a set of published application programmer interfaces (APIs) which are used to facilitate the exchange of data between the client and DAAT server 104. These APIs are set forth in detail in Appendix A. As the data is collected from the user, it is stored on DAAT server 104 pending an optional approval. An approval notice is sent to the specified person or persons as determined by the application rules as defined in the Task_Rules table. The Task_Rules table is set forth in detail in Appendix D. When all of the approvers have responded, DAAT server 104 continues processing the request. The request is then sent to the appropriate application agent 214. A set of APIs (see Appendix A) is used to facilitate the exchange of data between DAAT server 104 and the agent. If DAAT server 104 is not able to establish communications with the application's agent, it will periodically retry until the request is processed.

To make an application available to DAAT, the application agent 214 must be written. The DAAT server must be informed about the application it will now be administering. This information is registered with the DAAT server by an administrator, as described below. The information required is the application tasks and task rules, including approval routing and notification instructions. Application registration is accomplished on-line and takes effect immediately.

Still referring to FIGS. 2 and 3, the DAAT system is divided into three distinct components: client 312, DAAT server 104 (including task manager 202, request queue database 204, memory queue 206, and task processor 208, as shown in FIG. 2), and one or more agents 214–214N (such as agents 308 and 310 in FIG. 3). Each of these components will now be described in detail.

Client 312 is the interface to which a user sends and receives information. A client API provides the interface for the remote procedure calls (RPCs) from the client to DAAT server 104.

Task manager 202 (shown in FIG. 2) is the transaction engine that determines the execution of requests from client 302. It also resolves internal requests (i.e. approval routing and notifications). A service queue request table (referred to as svc_que_rqst) (i.e. request queue database 204 shown in FIG. 2) stores requests that are pending a later action and requests that have completed, failed, or were rejected. Memory queue 206, also referred to as an execution queue, stores those requests in the service queue table which are ready for execution on an application agent. Task processor 208 monitors execution queue 206 for requests that are pending action on any of the application agents 204. These requests are taken from execution queue 206 and are processed through DAAT server 104 to the appropriate application agent 214. Application agent 214 is a set of procedures, specified by the DAAT architecture, that implements the access administration functions for a given application.

The DAAT server/client communication design is object oriented, in which all the objects on the DAAT server are associated with interface definitions. The interface consists of a set of operations that can be performed by the DAAT server. The interface has a unique Interface ID (UUID) per DAAT server. The server program exports its interface information to the name service database and then, the client program can import this information for binding with the DAAT server. The following subsections describe the various parts of the DAAT DCE client/server high level design.

Binding Method

The DCE binding method is used by the client to determine the binding handle for the client stub, so the client can communicate to a DAAT server. This method uses the DCE-Namespace (NSI) to find the DAAT server. Each API has an explicit handle parameter that is used by the client API to connect to a specific DAAT server, as opposed to any DAAT server. These APIs are detailed in Appendix A. The use of explicit handles requires operations on the client side to pass the "handle" parameter. The client code obtains the "handle" information from the client stub.

IDL File

The IDL file contains the function prototypes that specify the input/output parameters for each API function, including the communication specific remote procedure call (RPC) parameters. These DAAT interface definitions are put in a file using the Interface Definition Language (IDL) syntax. Each RPC in the client program carries an explicit "handle" parameter which is used to talk to the server. The client obtains an RPC handle only once and reuses this handle as a parameter for every RPC. The handle variable is of type 'primitive'. The DAAT interface definitions are specified in detail in Appendix B.

The following is a generic DAAT Interface Definition. Each RPC will have its own specific definition. The collection of definitions completes the IDL file. The application_structure represents the send and receive parameters of an API.

```
GUI_CLIENT_RPC_FUNCTION_CALL (comm_handle of type RPC
handle,
                             comm_retcode,
                             application_structure(s), . . . ,
                             application_retcode)
```

Client

The client side of the application is the code that calls the DAAT server processes. The client code can be divided into two basic parts. The first part is code that initiates the communication with the DAAT server. This process includes locating the DAAT server's location in the DCE name space and binding to the DAAT server. The second part is actual calls to the API functions that are located in the task manager. The prototypes of these functions are described in the IDL file. These files are detailed in Appendix B.

Server

The server consists of the task manager and the task processor, both of which are described in greater detail below. The server side receives the request and implements the operations (ENROLL, UPDATE, etc.) through the task manager methods. The DAAT server routines include all communication tasks, such as initializations, multi-threading, DCE authentication, and exception handing. On startup, the DAAT server reads a configuration file (sys_parms.rc) that specifies many customizable values. The server configuration file is detailed in Appendix C.

Server Initialization

Figure 4:
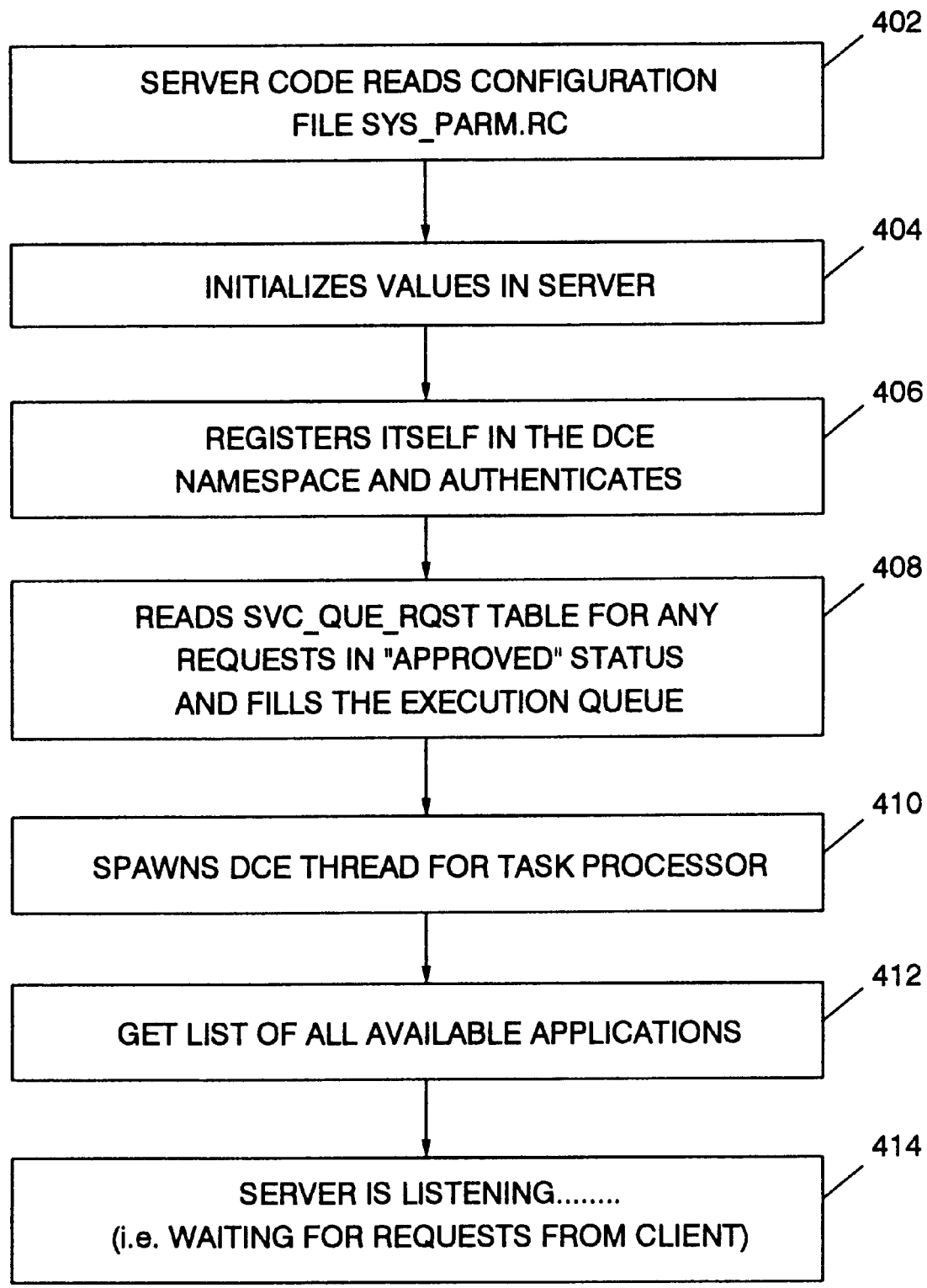
FIG. 4 is a flow chart depicting a method of initializing a DAAT server according to the teachings of the present invention.

Referring now to FIG. 4, a method for starting the DAAT server will now be described. After reading the configuration file (step 402), the DAAT server initializes the values read from the configuration file (step 404). The DAAT server, after authenticating itself, then initializes itself to DCE by registering with the DCE cell directory service (CDS), so clients can find it. The DAAT server adds itself to the namespace, along with information about the DAAT interfaces it implements (step 406). The server then reads the service queue table for any request in approved or in-process status to initially fill the execution queue (step 408). Next, the server spawns a thread to execute the task processor portion of the server (step 410). This thread reads the service queue request table to place any requests ready for execution in the server's internal memory queue (referred to as the execution queue). Next, the server gets a list of all available applications from the application table and forms an in memory linked list of the application IDs and their associated binding handles which is maintained by the MOB (step 412). Once the server initializes itself in DCE and spawns its needed thread, it then waits in a "listening" state until it receives work via a client API call (step 414).

Task Manager

The task manager portion of the DAAT server receives requests via the client APIs with the use of DCE RPCs. Different types of communication protocols are handled by the DCE RPC runtime library. The tasks are distributed to the floating threads which process the request. The task processor runs on one thread while the task manager uses multiple threads for processing the incoming client requests. The receiving RPC functions then call the appropriate processing routines (i.e. class methods), which are defined in the task manager modules. All requests are reviewed for authentication by using the DCE Authentication RPC's.

Figure 5:
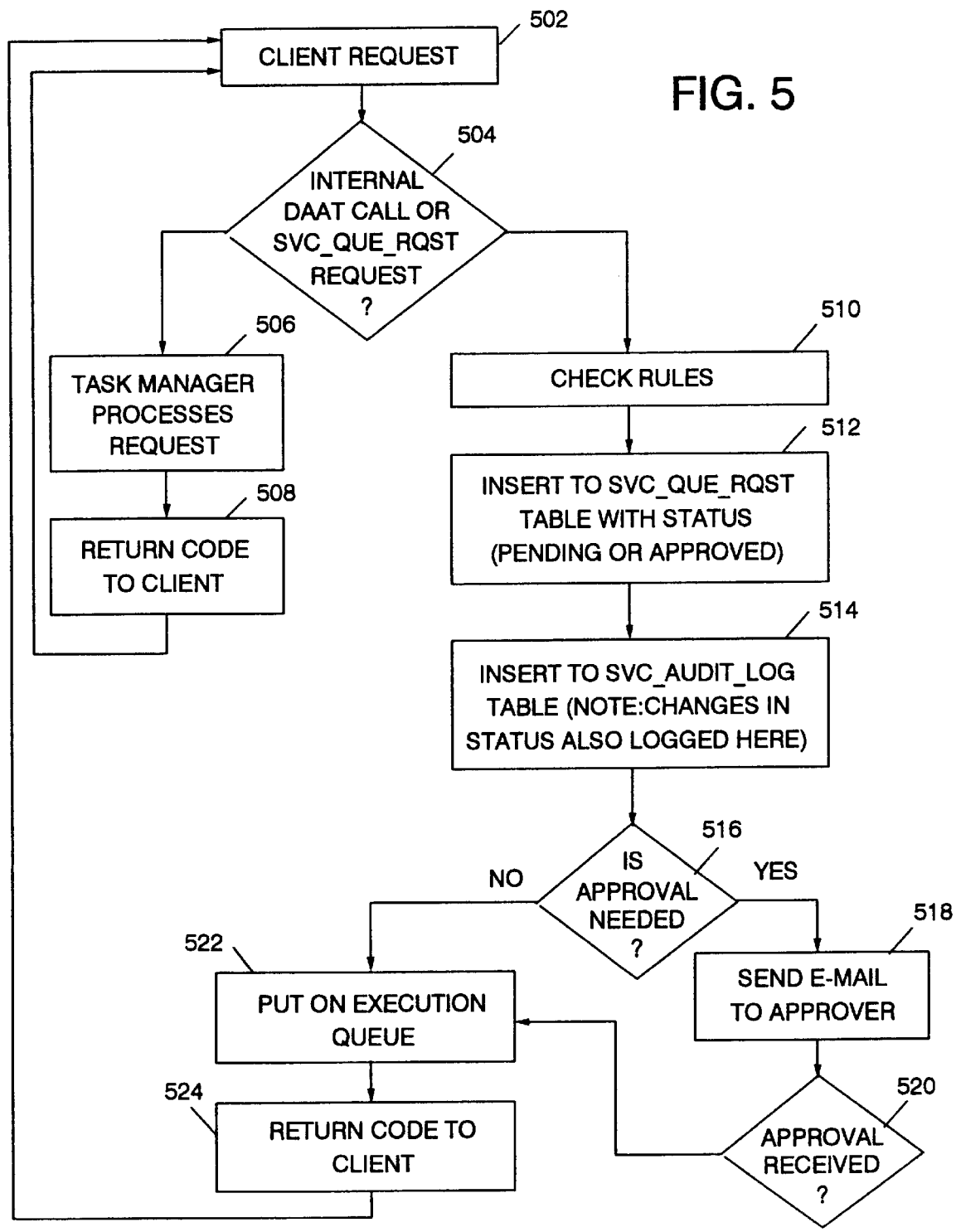
FIG. 5 is a flow chart depicting a method for sending a request from a client to the DAAT server according to the teachings of the present invention.

Referring now to FIG. 5, a method for handling client requests according to the present invention will now be described. After the task manager receives a request (step 502), a determination is made as to whether the request is an internal DAAT call or a service queue request (step 504). Internal tasks are executed within the task manager (step 506), and a return code is returned to the client (step 508). If the request is a service queue request, the rules are checked to determine if approval is needed (step 510). The request, along with its status, is then put into the service queue for processing (step 512). The service queue is a data table. This table contains information regarding the request which can be queried by users. The request, after being placed in this table, is also put in the audit log (step 514). Note that any status changes are also logged in the audit log. The types of requests in the service queue are application server tasks such as application enrolls, updates, and deletes.

Application specific requests are placed on the service queue to be processed by the task processor. As the task manager gets the request, it decides, depending on status, if the request should be placed on the execution queue. The service queue stores requests that are sent to the agents or processed within the DAAT server methods. These requests can be time tagged or simply cycled through the service queue until the request is successful. The task manager also determines if approval is needed (step 516). A request requiring approval is placed on the service queue in pending status awaiting approval. The task manager sends an e-mail to the user ID identified when the initiator was established (step 518). In the case where a delegator has been set up, the approval request is sent to the approved delegator's ID. Multiple approvers can be identified for a request. The approvers are established in tables associated with specific approval codes. If a request requires approval from a specific approval code, the person identified as an approver for this code is attached to the request. The approval routing is not complete until all approvers attached to the request have approved it.

An approver can approve or reject a request. If a request is rejected, the initiator is notified via e-mail. Upon approval of a request (step 520), the task manager updates the status of the request on the service queue and notifies the task processor by adding the request to the execution queue (step 522). A request that does not require approval is simply added to the execution queue (step 522). The execution queue may be implemented as an in-memory linked list which contains a request number, sub-numbers, etc., and an execution time for all requests pending execution in an application agent. Upon successfully placing the request in the execution queue, a successful return code is returned to the client so processing can continue (step 524).

Task Manager/Task Processor Process Flow

A request to install an application is processed by the task manager. A request is processed on its own dedicated thread throughout the task manager, until put in the service queue or until return code/information is sent back to the client. The request is then categorized into internal or external DAAT process. Internal DAAT processes are requests that do not need information sent to or from the application agent. External requests that must be sent to the application agent or routed, receive a request number (sequential from the next request number table (next_req_num)) and are stored in the service queue. Internal requests return information and/or codes back to the client and are processed without being stored in the service queue.

The external requests are placed into the service queue table, formatted for the particular application agent, and returned with a code to the requesting client. External requests requiring approval are placed on the service queue with a pending status. After returning codes to the client, the thread is then free to process another request from the queue.

The task processor thread is dedicated to the request taken from the execution queue until the processing on the application agent is finished or the task processor determines it cannot establish a connection to the application agent. If the connection is not established, the request is put back on the execution queue for later execution.

Task Processor

Once the task manager has placed a request on the execution queue, the task processor gets the request off of the execution queue. The task processor retrieves the data from the service queue and sends it to an instance of the MOB. The task processor class is "procedural." It acts as a "traffic cop" between the service queue and the MOB, and runs on a single thread.

Figure 6:
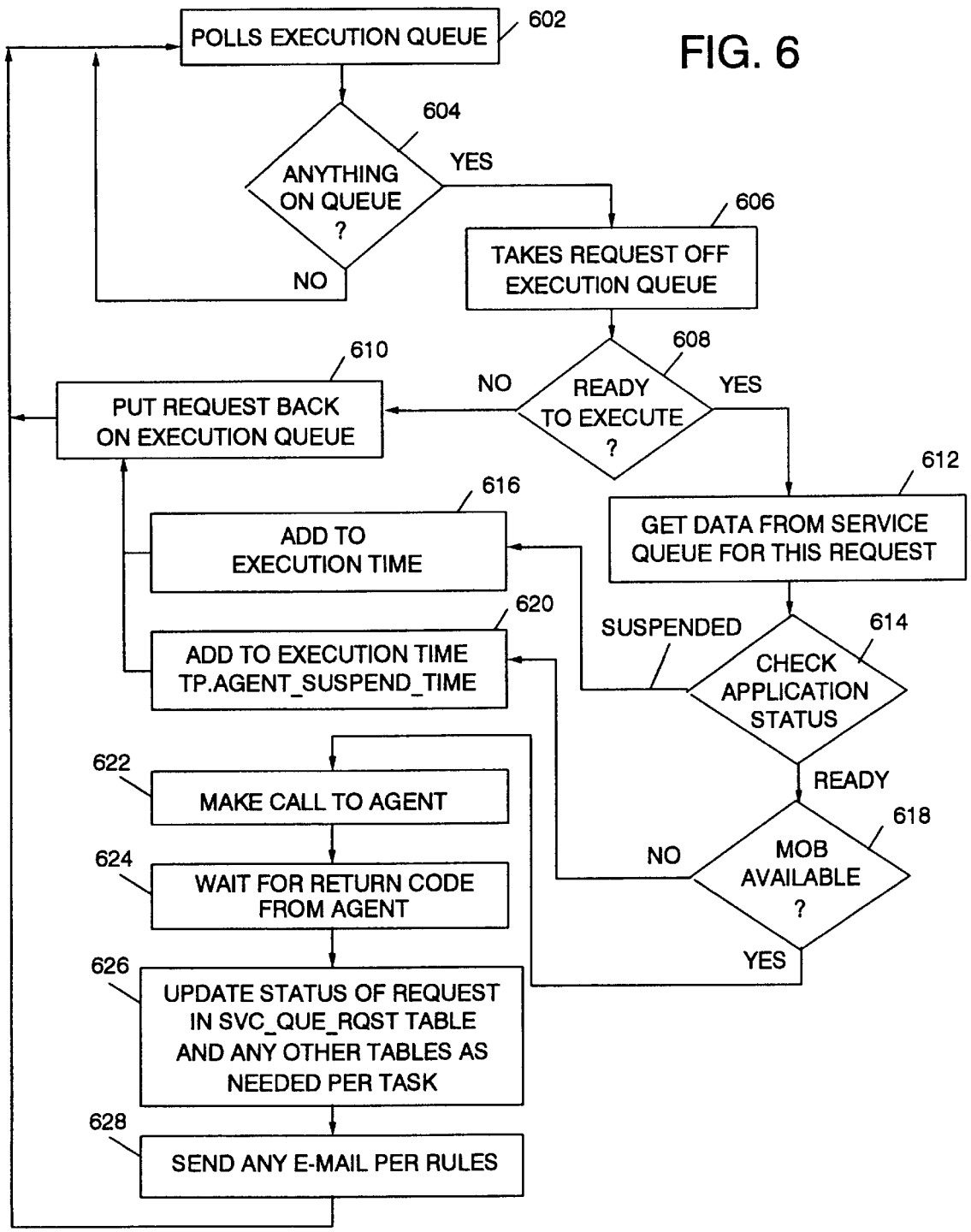
FIG. 6 is a flow chart depicting a method of processing a request by the task processor according to the teachings of the present invention.

Referring now to FIG. 6, a method for processing a request by the task processor is depicted. The processor thread continually polls the execution queue for requests to process (steps 602 and 604). If requests exist on the execution queue, a request is taken off the queue (step 606) and its execution time is checked to determine if it is ready to execute (step 608). If the execution time is greater than the current time, the request is put back on the execution queue (step 610). If the execution time is not greater than the current time, the actual data is retrieved from the service queue (step 612), and the application that the request is for is checked for its suspension status (step 614). If the application is suspended, the execution time is set for later execution (step 616) and the request is put back on the execution queue (step 610). If the application is not suspended, a connection to the application is attempted (step 618). If the application is not available, the execution time is again set for a later time (step 620), and the request is put back on the execution queue (step 610). If the application is available, application method call is issued to the MOB (step 622), and then the task processor waits for a return code from the agent (step 624).

If the MOB returns a successful or acceptable return code to the task processor, depending on the action taken, the task processor makes a call to the task manager to update the appropriate table (step 626). A return code of ACCEPT from the MOB indicates that the agent has accepted the work for future completion. Regardless of failure or success, when the return code is returned to the task processor call from the agent, the service queue is updated with a status of completion, the completion time, and any comments.

If the MOB returns a failing return code, the service queue status is updated, and a task manager method is called with a text message indicating the failure reason. When this task manager method is called, an e-mail message is sent to the application user (step 628).

A request to start or resume an application is processed by the task processor by making a call to the MOB to insert the application in the in-memory linked list shared by the task process and the MOB, along with the request's binding handle. The task processor thread also periodically scans to see if the "Ready" application's agents are available. Note that the time between scans is set in the server configuration file, sys_parm.rc, shown in Appendix C. If an agent cannot be contacted, a specified action is taken (i.e. call script to page application administrator, send e-mail, automatically resume agent, etc.).

Master Object (MOB)

The MOB provides an interface/conversion layer for communications between the task processor and the agent APIs. The MOB provides methods called by the task processor in order to execute the agent APIs. The MOB provides the single point of interface between the task processor and each application server. This approach is preferred so that the task processor will be able to call the MOB methods with little or no processing of the data pulled off of the service queue. As a result, the task processor needs no RPC specific knowledge. All binding, service location, and RPC related error management is encapsulated in the MOB.

The task processor's API to the MOB is based on the agent APIs and constructed to provide the most logical object oriented interface. The MOB is designed as an object having methods that correspond one-to-one with the agent API actions (e.g. delete, register, update, etc.).

RPC and Binding

The DAAT-to-agent topology results in DAAT acting as a client desiring to communicate with many different application servers. DAAT finds the required application server by utilizing DCE's cell directory service (CDS) and starting the search from a well-known point in the namespace. DAAT looks for server entries having a name that matches the application ID (i.e. the agent's DCE principal) that was registered in DCE when the application was registered to DAAT. This strategy employs explicit bindings for all RPCS.

The search and naming strategy was developed with the following requirements imposed:
1. All agents are written using the same interface name.
2. An agent should be able to shutdown and restart on a different host (with a different IP address) without the recompilation or shutdown/restart of DAAT server code.
3. New agents can be added without the recompilation or shutdown/restart of DAAT server code.
4. Multiple agents can run on the same physical machine (having only one IP address).

The following criteria apply to the API design. First, the DCE cell administrator needs to create a node entry somewhere in the name space for the export of DAAT application server entries, for example "daat_agents." The exact location in the name space is left to the discretion of the cell administrator. As a result, the fully qualified name of the node is /.:/cell tree/daat_agents. The entry may be made with a group entry, however the group entry functionality will not be utilized. This hierarchical structure has been adopted for the sake of simplicity and maintainability and should not be interpreted as an implementation of any group functionality.

Second, application servers should preferably use the fully qualified node name as the basis for exporting their service entries. Consequently, the agents will need to receive the fully qualified name either as a command line argument to the agent or from a startup file read upon initialization of the agent. The application agents should preferably support both.

Third, the entry name is preferably the same as the application ID that the application administrator entered into DAAT when the application was registered. Any changes to the application ID registered with DAAT will require the agent to be restarted and notified of the new application ID. The client code in the MOB will need to be notified of the change so that the object for that application can rebind. The agents should read their entry name either as a command line argument to the agent or from a startup file read upon initialization of the agent. The application agents should preferably support both.

Fourth, the application agent is responsible for creating an entry name including an object UUID. The object UUID may be generated at agent runtime and included when exporting its entry to the namespace. The entry name exported to the name space should be of the form:

/.:/cell tree/daat_agents/Application_ID

Note that "/.:/cell tree/daat_agents" is defined by the cell administrator and "Application_ID" is defined by the application administrator.

The following sections will describe the DCE administrative steps for setting up a DAAT server.

DCE Administration

The DAAT server runs using the DCE authentication/authorization services, in addition to the standard registration of their services with the namespace. Accordingly, several steps are required for the DAAT Server to function in a DCE framework. These steps are discussed below:

1. Provide a principal account for the DAAT server. The principal name should have login privileges. The DAAT server uses an authenticated server logon that allows the server to be started by an individual and assume the identity of the DAAT server principal, rather than of the person who invoked the agent. Typically, the DCE cell administrator is responsible for creating principals and their accounts. Note that the principal is created first, then the account is created. The cell name used in the transcript below and throughout this example is "ausdaat."

The example below is an rgy_edit transcript for adding a principal named "daatserver."
rgy_edit
Current site is: registry server at
/ . . . /ausdaat/subsys/dce/sec/master
rgy_edit=>do principal
Domain changed to: principal
rgy_edit=>add
Add Principal=>Enter name: daatserver
Enter UNIX number: (auto assign)
Enter full name: ( ) daat primary serverEnter object creation quota: (unlimited)
Add Principal=>Enter name: Account creation steps . . .
rgy_edit=>do acc
Domain changed to: account
rgy_edit=>add
Add Account=>Enter account id pname: daatserver
Enter account group gname: none
Enter account organization name: none
Enter password:
Retype password:
Enter your password:

Enter misc info: ( ) daat primary server
Enter home directory: (/)
Enter shell: ( )
Password valid y/n? (y)
Enter expiration date yy/mm/dd or 'none': (none)
Allow account to be server principal y/n? (y)
Allow account to be client principal y/n? (y)
Account valid for login y/n? (y)
Allow account to obtain post-dated certificates y/n? (n)
Allow account to obtain forwardable certificates y/n? (y)
Allow certificates to this account to be issued via TGT authentication y/n? (y)
Allow account to obtain renewable certificates y/n? (y)
Allow account to obtain proxiable certificates y/n? (n)
Allow account to obtain duplicate session keys y/n? (n)
Good since date yy/mm/dd: (1993/08/30.09:03)
Create/Change auth policy for this acct y/n? (n)
Add Account=>Enter account id name:
rgy_edit=>quit bye.

2. Provide a key table entry for the principal account. The keytab file contains a password for the DAAT server to use when authenticating itself to DCE. The keytab file is stored locally on the host where the DAAT server will run. Because the file is stored locally, special care must be taken to ensure that the file is readable only by IDs that will be invoking the DAAT server.

Use rgy_edit as shown below to create the keytab file:
OS prompt=>rgy edit
Current site is: registry server at
/ . . . /ausdaat/subsys/dce/sec/master
rgy_edit=>ktadd -p daatserver -f /path/tkeyfile
Enter password:
Re-enter password to verify:
rgy_edit=>quitbye.

3. DCE administrator creates a DAAT server entry. The server registers its interface as an object in the namespace so that DAAT clients may use the CDS to locate it. For example, assume that the server is going to be registered in the root directory of the namespace "/.:/." Using the server name, the administrator creates an entry in "/.:/." If the entry name (i.e. server name) is "daat," then the cell relative entry name in the DCE namespace would be "/.:/daat." The following command creates the object:
OS prompt>cdscp create object /.:/daat Note that the server name can not conflict with existing names already registered in the namespace. The names dce_agent and daatserver are typically reserved principal names in the DCE namespace, and should therefore not be chosen as server names. Also note that the server name will be needed by the DAAT server, as well as the DAAT clients when they are started.

4. Set namespace access control lists (ACLs) for the DAAT server principal. The DCE cell administrator may use acl_edit to set the permissions for the server entry so that the server can register itself, and so that other principals can not import the server's binding information. The DAAT server needs read, write, and test permission into the directory. The following is a transcript of a sample acl_edit session that a DCE cell administrator may perform. This transcript shows the ACLs being correctly set for a DAAT server principal named "daatserver." Once these ACLs are set, access for any other non-privileged principals should be removed. The following example assume a server principal name of "daatserver" and a server name of "daat."
OS prompt>acl_edit -e /.:/daat
sec_acl_edit>list# SEC_ ACL for /.:/daat: # Default cell=/ . . . /ausdaat
unauthenticated:r--t
user:cell_admin:rwdtc
group:subsys/dce/CDS-admin:rwdtc
group:subsys/dce/CDS-server:rwdtc
any_other:r--t
sec_acl_edit>m user:daatserver:rwt
sec_acl_edit>l# SEC_ ACL for /.:/daat: # Default cell=/ . . . /ausdaat
unauthenticated:r--t
user:cell_admin:rwdtc
user:daatserver:rw-t
group:subsys/dce/CDS-admin:rwdtc
group:subsys/dce/CDS-server:rwdtc
any_other:r--t
sec_acl_edit>exit Once the DCE steps outlined above are complete, the server executable can now be run.

Application Agent API Communications

The DAAT/application server APIs provide a consistent interface for DAAT to communicate with each of the application servers. The task processor communicates with an application specific instance of the MOB. The MOB then sends RPCs that conform to the architected API. The agent will convert them into commands that drive the registration software running on the application server. This API provides a single access point between the application agent and the task processor agent.

The application agent provides the facility for converting function request messages from the DAAT server into native commands that the registration script/process on the application server understands. An agent is written for each application that will be registered to DAAT. Once written, the agent is run as a DCE RPC server on the application server, and services function requests from the DAAT server.

Once the agent is started, it waits for messages from the DAAT server. Function requests are passed via RPCs as outlined in the DAAT server/application server API Appendix A. The agent is implemented so that each RPC specified in the API has a corresponding routine implementing that function. Each API function will be implemented to provide the commands native to the application server registration software. The agent is typically written by someone with detailed knowledge about the registration system in place for a particular application.

While the agent is preferably implemented in a high level language, compatibility with present registration systems is maintained. If portions of the registration process are currently handled using a shell level scripting language (i.e. PLATO, perl, ksh, REXX, etc.), then they can be easily invoked from the agent using the system( ) call. If required, the author of the agent can implement the required functionality primarily in shell scripts without requiring a high level of expertise in RPC or a high level programming language.

Application Installation

Installing an application requires three major steps: deploying the agent, registering the application with DAAT, and migrating existing user data into the DAAT database.

DAAT Application Registration

The application administrator registers an application by giving DAAT all the information required to manage the user IDs for that application. The information is used by the DAAT databases to characterize the registration process. Administrative contact information, data required by the application to register a user, task rules requirements, and screen layouts are examples of the information required by DAAT and provided at registration.

The application administrator, through the client interface, identifies the new application to DAAT and enters other general information about the application, which populates the fields in the application table. The application ID (appl_id field) is the agent's DCE principal. Once the application is added, the administrator can then add coordinators and families to the application.

The next step the administrator performs in setting up the application in DAAT is to identify the tasks the application supports from a pre-defined list of tasks that is provided by DAAT. This populates the application task (APPL_TASK) table.

Next, rules must be set for each task. Rules indicate the processing rules that specify both the level of approval/authorization needed and to whom the items are routed as well as any notification that should be sent. One rule for each available initiator type can be added. The initiator refers to the submitter of the request (i.e. the person that is logged on to DAAT). Available 'types' of initiators include:
1. Resource Owner
2. Owner's Manager
3. Manager
4. Other than Owner
5. Coordinator
6. Application Administrator
7. DAAT Administrator Addition of the rules populates the task rules (TASK_RULES) table. Rules are set per application, per task, for each of the user types. Other fields that are set in the task rules are as follows:
1. Approver Type
   Choices include:
   a. None—indicates no approval is needed to process this request through to the application agent.
   b. Notification—e-mail Notification after the request is processed (i.e. completed processing through the agent).
   c. Pre-Approval—Notification is sent to the approver of the request. The request is not sent to the application agent until all approvals are completed. If multiple approvers are required, see Setting Multiple Approvers section above.
   d. Post Approval—e-mail notification after the request is processed.
2. Completion Target—If set, the initiator gets an e-mail message indicating completion of the request with the status (success or failure) and other relevant information identifying the request.
   Choices include:
   a. None
   b. Initiator
3. Notification Target—If set, the chosen type gets an e-mail message notifying them that the noted task has occurred to the ID.
   Choices include:
   a. None
   b. Resource Owner
   c. Owner's Manager
   d. Old and New Manager The following fields are optional. Information may be entered in them, but it is not required. The messages are concatenated to the generic mail messages.
4. Completion Message—Enter text in this field. The message is e-mailed to the person specified in the completion target field.
5. Notification Message—Enter text in this field. The message is e-mailed to the person specified in the notification target field.

Setting Multiple Approvers:
If approval is required and there is to be more than one approver, additional approvers can be added to the approvers table. Approval codes are associated with each approver.

When a request is submitted, the approvers are attached to the request and stored in the approval request data table (APPR_RQST_DATA), keyed by request number.

For each application task and initiator type, prerequisites can be set up to populate the prerequisite rules table (PRE_REQ_RULES). This can be useful in maintaining a global name for all ID's across all applications.

To populate the prerequisite rules table, the following information is needed:
1. Initiator Type
2. Task ID
3. Application ID
   A user completes the following fields:
   1. Prerequisite application ID—Application ID that must exist, be renamed, etc.
   2. Choices include:
      a. User must have a matching ID on the prerequired application
      b. User must own an ID on the prerequired application.

There are three presentation client API RPCs that provide the GUI with all the functionality required to fill out the tables and implement a registration process. They are issued in the following order:
1. DtInstallApplication—Completes the necessary data for the application.
2. DtCreateTask—Completes the necessary data for the Application Task table.
3. DtCreateRouting—Creates one entry per task in the routing table.

Steps 2 and 3 are repeated until the application is fully defined.

At this point, all the DAAT tables are completed for defining the application. DAAT users, however, do not yet have visibility to the new application.

Applications in DAAT have status (i.e. not ready, ready, or suspended). An application is in the not ready state as the administrator is initially adding it to DAAT and setting up the rules.

Issuing the DtStartApplication RPC finishes the registration and allows users to perform DAAT operations for this application. If there is user data to migrate from the application server, then this is preferably done before the application is started. The process for data migration is covered in the migration section below.

Audit Trail

An audit trail of requests is maintained in the service audit log (SVC_AUDIT_LOG). Each time the status of a request changes, the request is captured in the service audit log table. The only status change that is not logged is described in the following example. The task processor pulls a request from the execution queue and the request status is changed to in-process (i.e. this status change is logged). The application or application user is suspended, or the application agent is not available and the task processor increases the execution time of the request, puts the request back on the queue, and changes the status back to approved (i.e. this status change is not logged). This process continues until the request is executed.

All requests whose status is completed, failed, rejected, or canceled are removed from the service queue request table and dropped to the service log table. A job separate from the DAAT server runs at specified intervals to maintain these tables.

Although the invention has been described with a certain degree of particularity, it should be recognized that elements thereof may be altered by persons skilled in the art without departing from the spirit and scope of the invention. The invention is limited only by the following claims and their equivalents.

What is claimed is:

1. A method of managing computing resources in a distributed computing environment, comprising the steps of:

receiving one or more requests from a client to access one or more of the computing resources;

checking one or more rules in response to receipt of the one or more resource requests to determine that one or more approvals are needed from a system of the distributed computing environment to grant access to a requested computing resource;

obtaining said one or more approvals needed to process the one or more resource requests automatically in response to said checking step determining that one or more approvals are needed;

sending the one or more resource requests to an application agent for processing, after obtaining the necessary approval;

processing, by the application agent, to provide one or more resources as specified by the one or more resource requests;

checking the one or more rules to determine if one or more notifications need to be sent; and notifying one or more users that the one or more resource requests have been processed.

2. A method of managing resources according to claim 1, further comprising the step of logging one or more states associated with the resource request in an audit log.

3. A method of managing resources according to claim 1, further comprising the step of initializing a server for receiving client requests.

4. A method of managing resources according to claim 3, wherein said step of initializing a server comprises the steps of:

reading a configuration file;

initializing the server according to one or more values read from the configuration file;

registering the server in a distributed computing environment namespace;

spawning a thread to execute a task processor for the server;

obtaining a list of one or more available applications; and waiting to receive client requests.

5. A method for managing resources according to claim 4, further comprising the steps of:

reading a service request queue; and placing one or more resource requests in the service request queue into an execution queue.

6. A method for managing resources according to claim 1, wherein said step of sending the resource request to an application agent for processing comprises the steps of:

polling an execution queue;

taking a request off the execution queue;

obtaining data regarding the resource request from a service request queue;

checking a status of the resource request; and if the resource request is in a ready state, calling the application agent to process the resource request.

7. A method for managing resources according to claim 6, further comprising the steps of:

waiting for a return code from the application agent; and updating the status of the resource request in the service request queue.

8. A method for managing resources according to claim 1, further comprising the step of adding a new application, along with an associated application agent, to the distributed computing environment.

9. A method for managing resources according to claim 8, wherein said step of adding a new application, along with an associated application agent, comprises the steps of:

identifying the new application to the server;

identifying one or more tasks supported by the new application; and setting one or more rules for each of the one or more tasks supported by the new application.

10. An apparatus for managing computing resources in a distributed computing environment, comprising:

one or more clients;

at least one server;

one or more application programs, each having an associated application agent;

a master object for communicating between the server and the application agents;

means for receiving one or more requests from a client to access one or more of the computing resources;

means for checking a rules table in response to receipt of the one or more resource requests to determine that one or more approvals are needed from a system of the distributed computing environment to grant access to a requested computing resource;

means for obtaining said one or more approvals needed to process the one or more resource requests automatically in response to said checking means determining that one or more approvals are needed;

means for sending the one or more resource requests, via the master object, to an application agent for processing, after obtaining the necessary approval;

means for processing, by the application agent, to provide one or more resources as specified by the one or more resource requests;

means for checking the rules table to determine if one or more notifications need to be sent; and means for notifying one or more users that the one or more resource requests have been processed.

11. An apparatus according to claim 10, further comprising:

an audit log; and means for logging one or more states associated with the resource request in the audit log.

12. An apparatus according to claim 10, further comprising means for initializing a server to receive client requests.

13. An apparatus according to claim 12, wherein said means for initializing a server comprises:

means for reading a configuration file;

means for initializing the server according to one or more values read from the configuration file;

means for registering the server in a distributed computing environment namespace;

means for spawning a thread to execute a task processor for the server;

means for obtaining a list of one or more available applications; and means for waiting to receive client requests.

14. An apparatus according to claim 13, further comprising:

a service request queue; and means for placing one or more resource requests in the service request queue into an execution queue.

15. An apparatus according to claim 10, wherein said means for sending the resource request to an application agent for processing comprises:

means for polling an execution queue;

means for taking a request off the execution queue;

means for obtaining data regarding the resource request from a service request queue;

means for checking a status of the resource request; and means for calling the application agent to process the resource request.

16. An apparatus according to claim 15, further comprising:

means for waiting for a return code from the application agent; and means for updating the status of the resource request in the service request queue.

17. An apparatus resources according to claim 10, further comprising means for adding a new application, along with an associated application agent, to the distributed computing environment.

18. An apparatus according to claim 17, wherein said means for adding a new application, along with an associated application agent, comprises the steps of:

means for identifying the new application to the server;

means for identifying one or more tasks supported by the new application; and means for setting one or more rules for each of the one or more tasks supported by the new application.

19. A computer readable medium for managing computing resources in a distributed computing environment, comprising:

means for receiving one or more requests from a client to access one or more of the computing resources;

means for checking a rules table in response to receipt of the one or more resource requests to determine that one or more approvals are needed from a system of the distributed computing environment to grant access to a requested computing resource;

means for obtaining said one or more approvals needed to process the one or more resource requests automatically in response to said checking means determining that one or more approvals are needed;

means for sending the one or more resource requests, via a master object, to an application agent for processing, after obtaining the necessary approval;

means for processing, by the application agent, to provide one or more resources as specified by the one or more resource requests;

means for checking the rules table to determine if one or more notifications need to be sent; and means for notifying one or more users that the one or more resource requests have been processed.

20. A computer readable medium according to claim 19, further comprising means for logging one or more states associated with the resource request in an audit log.

21. A computer readable medium according to claim 19, further comprising means for initializing a server to receive client requests.

22. A computer readable medium according to claim 21, wherein said means for initializing a server comprises:

means for reading a configuration file;

means for initializing the server according to one or more values read from the configuration file;

means for registering the server in a distributed computing environment namespace;

means for spawning a thread to execute a task processor for the server;

means for obtaining a list of one or more available applications; and means for waiting to receive client requests.

23. A computer readable medium according to claim 22, further comprising means for placing one or more resource requests in a service request queue into an execution queue.

24. A computer readable medium according to claim 19, wherein said means for sending the resource request to an application agent for processing comprises:

means for polling an execution queue;

means for taking a request off the execution queue;

means for obtaining data regarding the resource request from a service request queue;

means for checking a status of the resource request; and means for calling the application agent to process the resource request.

25. A computer readable medium according to claim 24, further comprising:

means for waiting for a return code from the application agent; and means for updating the status of the resource request in the service request queue.

26. A computer readable medium according to claim 19, further comprising means for adding a new application, along with an associated application agent, to the distributed computing environment.

27. A computer readable medium according to claim 26, wherein said means for adding a new application, along with an associated application agent, comprises:

means for identifying the new application to the server;

means for identifying one or more tasks supported by the new application; and means for setting one or more rules for each of the one or more tasks supported by the new application.

* * * * *